Jan. 1, 1935.  J. W. SMITH  1,986,418
SPRAY VALVE FOR COMBUSTION CHAMBERS
Filed Oct. 10, 1931  2 Sheets-Sheet 1
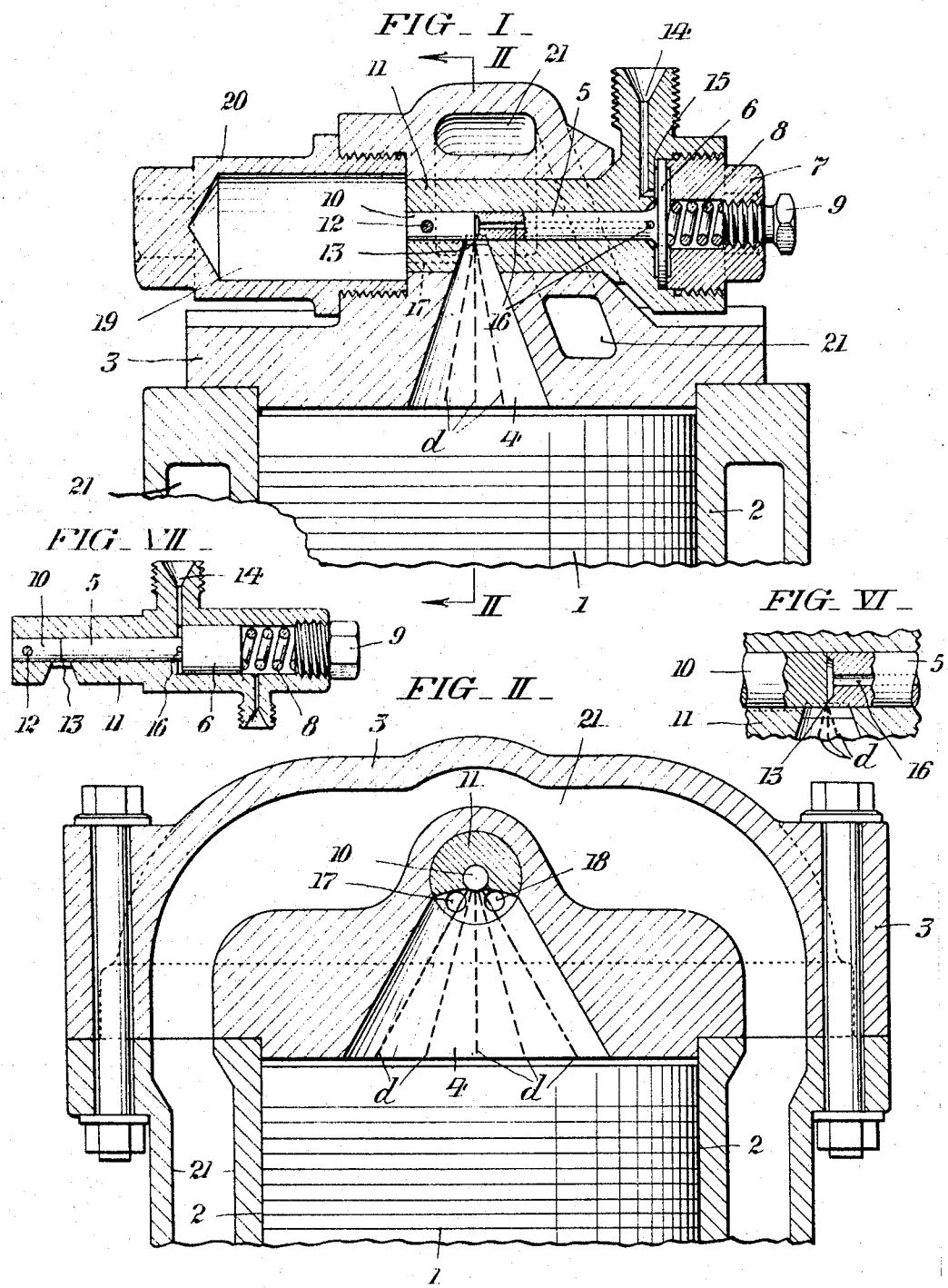
WITNESSES:
Hubert Fuchs
William Bell, Jr.
INVENTOR:
John W. Smith,
BY Fraley & Paul
ATTORNEYS.

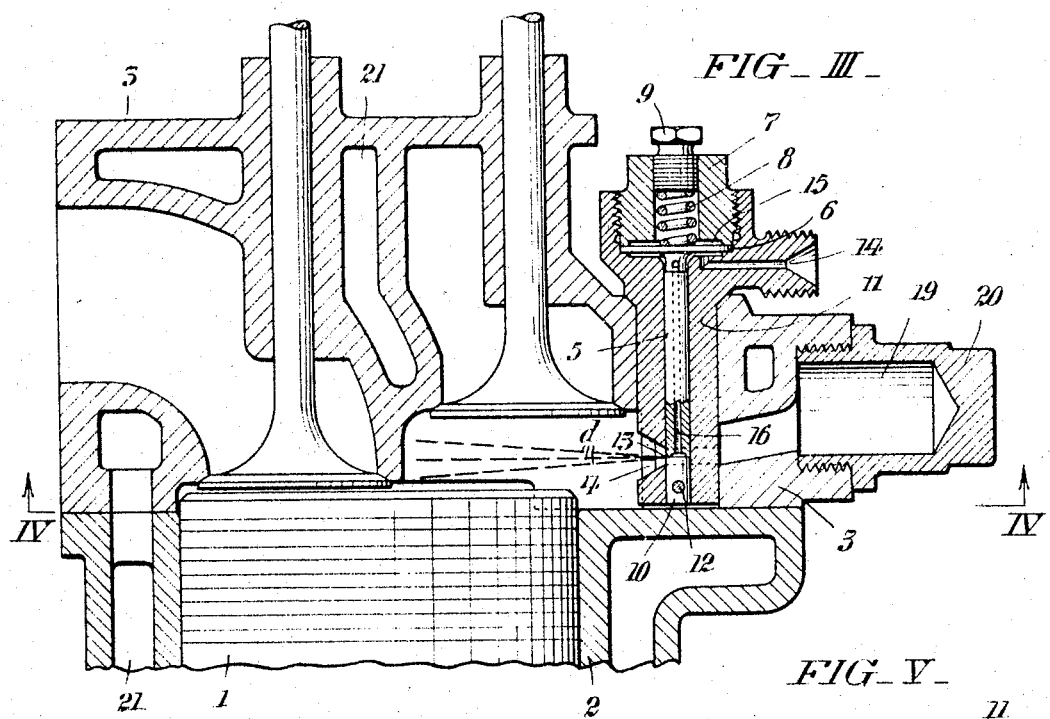
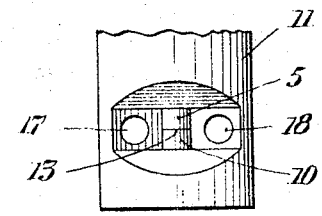
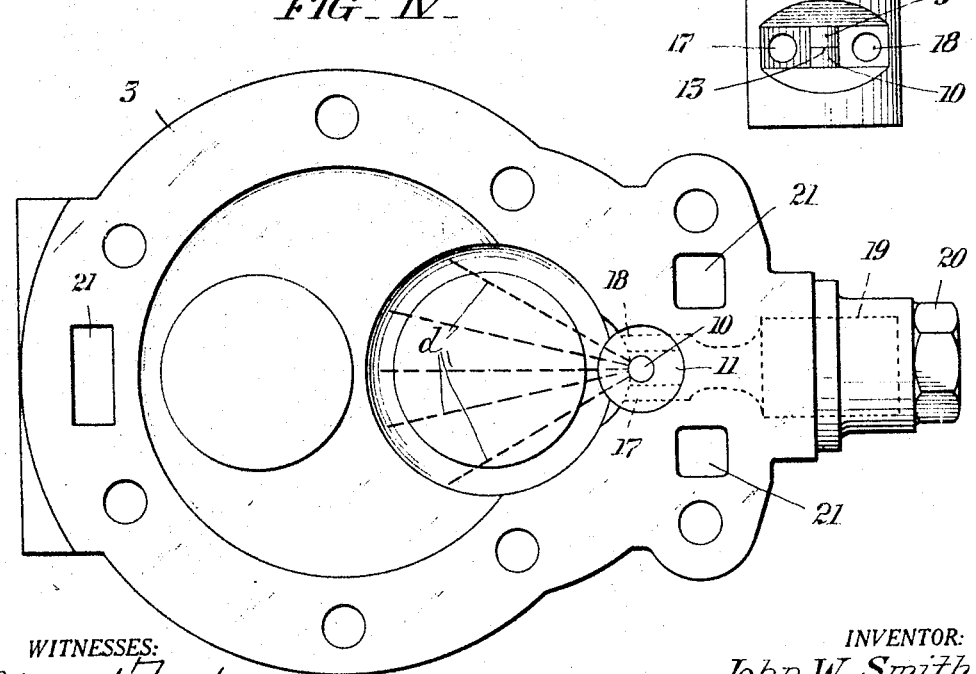

Patented Jan. 1, 1935

1,986,418

UNITED STATES PATENT OFFICE 1,986,418

SPRAY VALVE FOR COMBUSTION CHAMBERS

John W. Smith, Overbrook Manor, Philadelphia, Pa.

Application October 10, 1931, Serial No. 568,095

11 Claims. (Cl. 299—107.6)

This invention relates to the spraying of liquid fuels into a combustion chamber and may be designed to meet the requirements of large or small engines, either two-stroke or four-stroke engines.

The primary object of this invention is to produce a spray of any desired thickness and width relative to a specified hydrostatic pressure. The angle or spread of the spray is controlled by the circumferential opening at the valve seat.

The thickness of the spray is controlled by the diameter of the valve plunger or valve seat, relative to a predetermined hydrostatic pressure.

A typical example for a small engine would be as follows: Valve stem and seat $\frac{1}{32}$" in diameter; circumferential opening $\frac{1}{16}$"; valve lift 4/1000"; spread of spray 30° on each side of the radial line; and a pressure of two thousand pounds per square inch.

The equivalent capacity for the multiple-hole nozzle heretofore used would require four holes about four-one-thousandths of an inch in diameter; such small holes are difficut to drill and apt to become clogged; and the spray distribution would not be so efficient.

The hydrostatic diaphragm actuated valve has a decided advantage over the piston type. The diaphragm eliminates leakage, is simple to manufacture and may be proportioned to carry a high pressure on the valve seat. High pressure on the valve seat is important in eliminating leakage at the valve seat. Hardened valve stem and valve plug seats are maintained by employing air hardening steel made full hard.

With the foregoing in view my present improvements comprehend certain combinations and arrangements of parts, as well as structural features hereinafter described and claimed; it being understood that changes in the precise embodiment of the invention illustrated may be made within the scope of what is claimed without departing from the spirit of said invention.

In the drawings:—

Fig. I is a vertical section through the upper portion of the working cylinder of a two-stroke internal combustion engine embodying the present invention.

Fig. II is a similar section taken approximately as indicated by the arrows II—II in Fig. I.

Fig. III is a sectional view showing the adaptation of my present invention to a four-stroke internal combustion engine.

Fig. IV is an underside plan view of the cylinder head, taken as indicated by the arrows IV—IV in Fig. III.

Fig. V is an enlarged broken elevation of the lower portion of a diaphragm valve body, hereinafter fully explained.

Fig. VI is a fragmentary enlarged sectional view of the valve stem and associated parts, later on particularly described; and, Fig. VII illustrates a piston actuated spray valve which works in the same manner as the diaphragm actuated valve, the only difference being the substituting of a piston for the diaphragm.

Referring, more particularly, to Figs. I and II, which illustrate a combustion chamber for a two-stroke internal combustion engine, the piston 1 is free to reciprocate in the cylinder 2, while the cylinder head 3 embodies the combustion chamber 4.

Referring to Fig. I, the spray valve stem 5 has located at one end a diaphragm 6 held in place by threaded plug 7, while a compression spring 8 is forced against said diaphragm by means of an adjuster screw 9.

Valve seat 10 is a tight fit in body 11 and is held in place by a locating pin 12. Valve stem 5 has a working fit in the valve body 11 and rests against valve seat 10.

Fig. VI shows valve stem 5 as having an annular ledge which forms the valve seal 13.

Referring to Fig. I, fuel oil is forced under pressure into a channel or inlet 14 by a suitable pump, not shown. The fuel under pressure in inlet channel 14 is forced into the annular diaphragm cavity 15, exerting sufficient pressure on diaphragm 6 to overcome the tension of spring 8, thereby causing a slight movement of the valve stem 5 and thus opening up valve seal 13 for the spraying of fuel. A channel 16 is in communication with the fuel inlet channel 14 by way of the diaphragm cavity 15.

In Figs. I and II, dotted lines d represent the direction of spray. Nozzle holes 17 and 18, as shown in Fig. II, are drilled to connect with the fresh air reservoir 19, conveniently formed in a removable fitting 20. Figs. I and II show an installation for a two-stroke engine in which the spray nozzle valve body 11 is mounted in the combustion chamber 4 at right angles to the bore of the cylinder 2.

Too much heat in the spray nozzle body 11 must be avoided, and this is accomplished by surrounding said spray nozzle with a cooling channel 21 in the cylinder head 3 through which a suitable cooling liquid is circulated.

Figs. III and IV illustrate a cylinder head 3 suitable to a four-stroke internal combustion engine; and as the external parts correspond with those already explained, in connection with Figs. I and II, similar reference characters are applied thereto to avoid repetitive description. The spray nozzle valve body 11 is mounted in a position parallel with the axis of the cylinder bore 2. Also the air nozzles 17 and 18, as shown in Fig. V, are drilled at right angles to the axis of the valve body 11, see Fig. IV. Otherwise the spray nozzle is identical with the one shown in Fig. II; while the air reservoir 20 functions in the same manner as that shown in Fig. I, and represents the subject-matter of a companion application.

It will, of course, be self-evident that various changes may be effected in the details of construction within the scope of my invention as defined by the following claims.

Having thus described my invention, I claim:

1. A spray valve comprising a stem with an internal liquid conducting passage; a body affording a seat against which the end of the stem closes; and a lateral segmental circumferential spray outlet port at the seat; means for holding the valve stem against the seat at a predetermined pressure; and means for forcing the stem away from the seat to open the valve when a predetermined pressure of liquid within the valve stem is reached.

2. A spray valve comprising a stem with a liquid conducting internal passage; a body affording a seat against which the end of the stem closes, and a lateral segmental circumferential spray outlet port at the seat; and means for axially shifting the stem relative to the seat within the body to open and close the valve.

3. A spray valve comprising a stem with an internal liquid conducting passage; a body affording a seat against which the end of the valve stem closes, and a lateral segmental circumferential spray outlet port at the seat; and means influenced by the pressure of the fluid for axially shifting the stem relative to the seat within the body to open the valve.

4. A spray valve comprising a stem with an axial conducting passage; a body affording a seat against which the end of the valve stem closes, and a lateral segmental circumferential spray outlet port at the seat; and diaphragm means influenced by the pressure of the liquid for axially shifting the stem relative to the seat within the body to open the valve.

5. A spray valve comprising a stem with an internal liquid conducting passage; a body affording a seat against which the end of the stem closes, and a lateral segmental circumferential spray outlet port at the seat; means influenced by the pressure of the liquid for axially shifting the stem relative to the seat within the body to open the valve; and spring means for yieldingly resisting movement of the valve stem.

6. A spray valve comprising a stem with an internal liquid conducting passage; a body affording a seat against which the end of the stem closes, and a lateral segmental circumferential spray outlet port at the seat; means influenced by the pressure of the liquid for axially shifting the stem relative to the seat within the body to open the valve; a spring for yieldingly resisting the movement of the stem; and means whereby the spring may be adjusted to determine the extent of valve opening.

7. In a spraying valve, a bored body member including an inlet and an expanding outlet for a combustible under pressure; a valve stem, in the body bore, having a diaphragm at one end and an axial duct in communication with the body member inlet; an imperforate seat in the body member bore with which the valve stem free end coacts; means securing the diaphragm in the body member with capacity for flexure to reciprocate the valve stem; and means engaging the diaphragm tending to normally hold the valve stem free end in contact with the imperforate seat, whereby discharge of combustible between said valve stem free end and seat through the valve body outlet at a predetermined pressure and thickness is controlled.

8. In a spraying valve, a bored body member including an inlet and an outlet for a liquid under pressure; a valve stem, in the body bore, having a diaphragm at its outer end and an axial duct with a radial passage in communication with the body member inlet; an imperforate flat seat in the body member bore with which the valve stem free end coacts the valve body outlet aforesaid being cut away radially of said seat; means circumferentially securing the diaphragm in the body member with provision of an annular cavity at each side thereof and with capacity for flexure to reciprocate the valve stem; and a spring under compression abutting the outer side of the diaphragm normally forcing the valve stem inner end into contact with the imperforate seat, whereby discharge of liquid from the valve body radially cut-away outlet at a predetermined spray angle and thickness are controlled.

9. The combination of claim 8 wherein the valve seat is provided by a plug having a force fit in the body bore and held in place by a locating pin, and the valve stem free end is recessed to provide an annular seat engaging portion.

10. The combination of claim 8 wherein the diaphragm engaging spring has associated means to adjust its compressive pressure.

11. A fuel spray valve for internal combustion engines comprising a valve stem with an internal liquid fuel conducting passage; a valve body incorporated with the cylinder of the engine, affording a seat against which the end of the valve stem closes, and a lateral circumferential spray outlet port at the seat in direct communication with a combustion chamber opening into the cylinder; and means for axially shifting the stem within the valve body to open and close the valve.

JOHN W. SMITH.